United States Patent
Cattoor et al.

(10) Patent No.: US 11,718,170 B2
(45) Date of Patent: Aug. 8, 2023

(54) VEHICLE TRANSMISSION WITH DISCONNECT DEVICE FOR POWER TAKE IN

(71) Applicant: Dana Belgium N.V., Flanders (BE)

(72) Inventors: Kurt Cattoor, Koolkerke (BE); Filip D. Schacht, Meulebeke (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 17/538,840

(22) Filed: Nov. 30, 2021

(65) Prior Publication Data

US 2023/0166591 A1 Jun. 1, 2023

(51) Int. Cl.
| | |
|---|---|
| *B60K 17/354* | (2006.01) |
| *B60K 6/387* | (2007.10) |
| *F16D 25/10* | (2006.01) |
| *F16D 48/02* | (2006.01) |
| *F15B 15/20* | (2006.01) |
| *F16D 25/061* | (2006.01) |
| *F16D 127/02* | (2012.01) |
| *F16D 121/04* | (2012.01) |
| *B60K 6/00* | (2006.01) |

(Continued)

(52) U.S. Cl.
CPC ............ *B60K 6/387* (2013.01); *B60K 17/354* (2013.01); *F15B 15/20* (2013.01); *F16D 25/061* (2013.01); *F16D 25/10* (2013.01); *F16D 25/14* (2013.01); *B60K 6/00* (2013.01); *B60K 6/48* (2013.01); *B60K 2006/4825* (2013.01); *B60Y 2200/91* (2013.01); *B60Y 2200/92* (2013.01); *B60Y 2400/421* (2013.01); *F15B 2211/6306* (2013.01); *F16D 11/00* (2013.01); *F16D 2011/002* (2013.01); *F16D 2121/04* (2013.01); *F16D 2127/02* (2013.01); *F16D 2300/14* (2013.01)

(58) Field of Classification Search
CPC .................. B60K 17/354; B60K 6/387; B60K 2006/4825; B60K 6/46; F16D 25/061; F16D 2011/002; F16D 2121/04; F16D 2300/14; F16D 25/10
See application file for complete search history.

(56) References Cited

U.S. PATENT DOCUMENTS

| | | |
|---|---|---|
| 5,098,352 A | 3/1992 | Montanaro et al. |
| 5,743,144 A | 4/1998 | Krantz |

(Continued)

FOREIGN PATENT DOCUMENTS

DE  102019105056 A1 * 8/2020

OTHER PUBLICATIONS

Machine translation of DE102019105056A1, retrieved from www.espacenet.com (Year: 2023).*

(Continued)

*Primary Examiner* — Stacey A Fluhart
(74) *Attorney, Agent, or Firm* — McCoy Russell LLP

(57) ABSTRACT

Methods and systems for a vehicle transmission are provided herein. The vehicle transmission includes an input interface configured to mechanically couple to a motive power source. The vehicle transmission further includes a first disconnect device releasably mechanically coupling a first output to a first drive axle and a second disconnect device releasably mechanically coupling a second output to a second drive axle.

18 Claims, 5 Drawing Sheets

(51) Int. Cl.
*B60K 6/48* (2007.10)
*F16D 11/00* (2006.01)

(56) References Cited

U.S. PATENT DOCUMENTS

| | | | |
|---|---|---|---|
| 7,540,823 B2 | 6/2009 | Kilian et al. | |
| 8,382,633 B2* | 2/2013 | Cooper | F16H 48/08 |
| | | | 475/241 |
| 8,783,124 B2* | 7/2014 | Rang | B60K 17/28 |
| | | | 74/15.88 |
| 9,050,882 B2 | 6/2015 | Mellet et al. | |
| 9,447,726 B2 | 9/2016 | Hemphill | |
| 2012/0325030 A1* | 12/2012 | Kinsey | B60K 17/34 |
| | | | 74/15.82 |
| 2016/0039284 A1 | 2/2016 | Osborn et al. | |
| 2016/0281794 A1* | 9/2016 | Pawlakowitsch | F16D 11/14 |
| 2019/0249725 A1* | 8/2019 | Kocevar | F16D 25/082 |
| 2019/0264753 A1* | 8/2019 | Creech | B60K 17/35 |

OTHER PUBLICATIONS

Schacht, F. et al., "Vehicle Transmission With Disconnect Devices," U.S. Appl. No. 17/342,438, filed Jun. 8, 2021, 27 pages.

\* cited by examiner

VEHICLE TRANSMISSION WITH DISCONNECT DEVICE FOR POWER TAKE IN

TECHNICAL FIELD

The present disclosure relates generally to a vehicle transmission a disconnect device at a transmission input interface with a supplemental power source and operating strategies for the transmission.

BACKGROUND AND SUMMARY

In some vehicles, a supplemental power source is added to a transmission as an additional power source selectively operated as a power take-in to assist a motive power source by supplying power to the transmission (e.g., in addition or as an alternative to the motive power source) at a supplemental interface thereof. For example, during some operating conditions, such as when precise maneuvering at low speeds is demanded, or when vehicle acceleration is requested, receiving power from the supplemental power source may be desirable.

U.S. Pat. No. 9,050,882 B2 to Mellet teaches a hybrid transmission with a disconnect clutch that mechanically disconnects an engine from the transmission. The transmission further includes an electric motor that supplies a supplemental driving torque to the transmission. The inventors have recognized several drawbacks with Mellet's transmission disconnect system and as well as other disconnect devices and power take-in arrangements. For instance, Mellet's disconnect clutch is arranged to decouple the engine from the transmission, while the motor is constantly connected to an input of the transmission. As such, when the engine is disconnected from the transmission, some hydraulic systems in the transmission, such as a transmission pump supplying power to valves for actuation of hydraulic clutches and other actuators, may not be capable of providing the needed hydraulic pressure for desired vehicle operations. Further, in some cases, it may be desirable to provide a disconnect mechanism capable of selectively coupling and decoupling a supplemental power source, such as a hydraulic or electric motor, from the transmission at a separate input interface of the transmission, in order to supply the transmission with power from either of the power sources as desired during different operating conditions.

The inventors have recognized the abovementioned issues and developed a vehicle transmission to overcome at least a portion of the challenges. The vehicle transmission includes an input interface configured to mechanically couple to a motive power source. The vehicle transmission further includes a supplemental input interface configured to mechanically couple to a supplemental power source and a first hydraulically actuated disconnect device releasably mechanically coupling the supplemental power source to the vehicle transmission. In this way, the transmission is provided with an additional power source that can be strategically connected and disconnected from the transmission as desired, so that the transmission receives can receive power from the supplemental power source in addition or as an alternative to the motive power source during certain operating conditions. Consequently, by providing a supplemental power source that can be efficiently and selectively coupled to the transmission as desired, the transmission's efficiency may be increased as power demands on the motive power source are reduced.

In another example, a vehicle transmission is provided that includes a disconnect device coupled to an input shaft of a supplemental power source. The disconnect device includes a splined sleeve mated with the input shaft. The disconnect device further includes a hydraulic actuation system including a hydraulic actuator coupled to the splined sleeve. The hydraulic actuator is further configured to axially translate the splined sleeve in opposing directions to place the hydraulic actuator in an engaged configuration and a disengaged configuration. In the engaged configuration, the splined sleeve mates with a splined transmission shaft. Further, the hydraulic actuation system is configured to automatically transition the hydraulic actuator into the disengaged configuration responsive to a hydraulic pressure in the hydraulic actuation system decreasing below a threshold value. In this way, the supplemental power source may be passively disconnected from the transmission during selected operating conditions. Further, the disconnect system and supplemental power source may be efficiently and effectively incorporated into an existing transmission architecture, where providing the supplemental power source and disconnect device system at a supplemental input of the transmission may allow the transmission's manufacturing process to be simplified, if desired.

Further, in one example, the hydraulic pressure to activate the disconnect device (e.g., transition the disconnect device into the engaged configuration) may be supplied by a regulator valve that may be used in the transmission for other hydraulic components, such as hydraulically operated clutches. Further, in some cases where a motive power source is a combustion engine, the motive power source may continue running in neutral to provide hydraulic pressure to the regulator valve as desired to, for instance, transition the disconnect device into an engaged configuration to couple the supplemental power source to the transmission when additional power is demanded. The cost and complexity of the transmission may therefore be reduced due to the dual-use functionality of the regulator valve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-4 are drawn approximately to scale. However, other relative component dimensions may be used, in other embodiments.

DETAILED DESCRIPTION

A vehicle transmission with a disconnect device that rotationally couples and decouples a transmission input interface from a supplemental power source is described herein. The transmission further includes a motive power source mechanically coupled to another transmission input interface. The disconnect device is designed to automatically disengage when the pressure in a hydraulic actuation system drops below a threshold pressure. Further, the hydraulic actuation system may use pressurized fluid from the motive power source, when the motive power source is an internal combustion engine, for instance. Using the engine's existing hydraulics for disconnect device control allows the transmission to be simplified, where a dedicated electric motor which powers the disconnect device may be omitted, if desired. The disconnect device may provide a simple and efficient mechanism for selectively coupling the supplemental power source to the transmission to provide additional power as needed, in addition or as an alternative to the motive power source, during certain operating conditions, such as when precise maneuvering, low vehicle speeds, and/or acceleration are demanded. As such, the size of the motive power source may be decreased, which may decrease the size, weight and cost of the transmission while increasing transmission efficiency.

Figure 1:
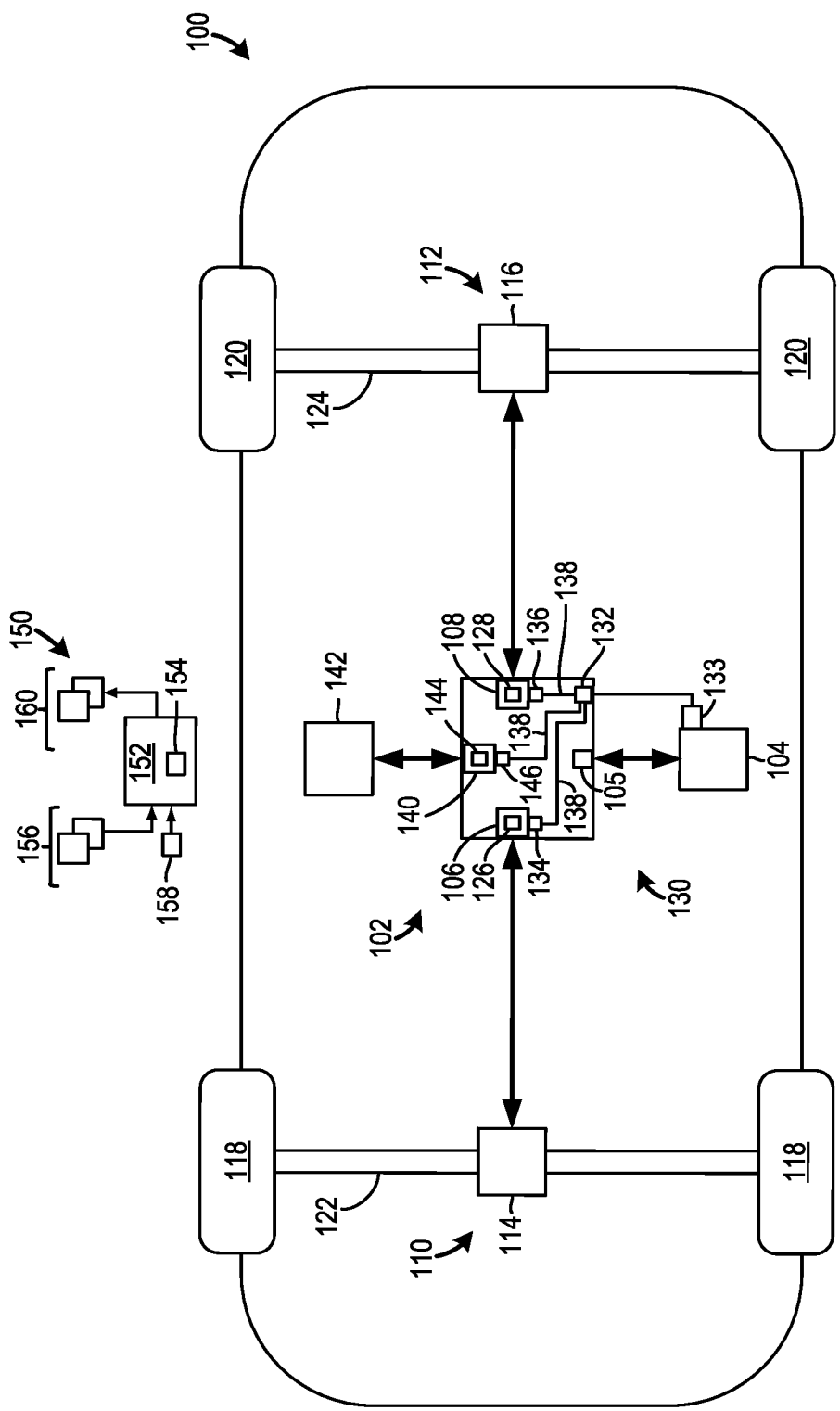
FIG. 1 shows a vehicle with a transmission.

A vehicle 100 is depicted in FIG. 1 with a transmission 102. The vehicle 100 may be a light, medium, or heavy duty vehicle. Further, the transmission 102 may be a power-split type transmission where the transmission is designed to provide power to the drive wheels from both a traction motor and an internal combustion engine, during certain operating conditions. In such an example, the transmission may be a continuously variable transmission that is capable of smoothly transitioning through a continuous number of gear ratios within a predetermined range. In other examples, the transmission 102 may be a powershift type transmission. As such, the powershift transmission may include multiple clutches designed to automatically shift between discrete gear ratios. In yet another example, the transmission 102 may be a hydrostatic transmission with a hydraulic pump and a hydraulic motor that use hydraulic pressure to drive rotation of the outputs of the transmission.

The transmission 102 may be rotationally coupled to a motive power source 104. The motive power source 104 may include an internal combustion engine and/or a traction motor. As such, the vehicle may be configured as an EV, a hybrid electric vehicle (HEV), or a vehicle using solely an internal combustion engine. The internal combustion engine may include conventional components such as cylinders, pistons, intake valves, exhaust valves, a fuel delivery system, and the like, to permit the engine to perform combustion cycles. The traction motor may include conventional components such as a rotor, a stator, and the like. To facilitate the rotational attachment between the transmission and the motive power source, an input interface 105 may be provided in the transmission. The input and output of the transmission are indicated with regard to a drive mode. However, during coasting, or regeneration in the case of an EV or HEV, power may flow from the transmission back to the motive power source.

The transmission 102 may additionally include a first output interface 106 and/or a second output interface 108. The output interfaces 106, 108 are designed to rotationally attach to drive axles 110, 112, respectively. Suitable mechanical structures may be provided in the output interfaces such as flanges, splines, bolts, plates, combinations thereof, and the like. Further, mechanical components such a drive shafts, gears, belts, chains, and the like may be used to transfer power from the output interfaces to the differentials in the drive axles. The drive axles 110, 112 may include differentials 114, 116 coupled to drive wheels 118, 120 via axle shafts 122, 124. The differentials 114, 116 may be open differentials, locking differentials, limited slip differentials, etc.

A first disconnect device 126 is coupled to the first output interface 106. The first disconnect device 126 is designed to selectively mechanically couple a transmission shaft to the first output interface. A second disconnect device 128 may be coupled to the second output interface 108. Similar to the first disconnect device, the second disconnect device is designed to selectively mechanically couple a transmission shaft to the second output interface 108. In other words, both of the first and second disconnect devices may releasably mechanically couple the transmission to corresponding drive axles.

The transmission 102 may further include a second input interface 140 designed to selectively rotationally attach to a supplemental power source 142. The supplemental power source 142 may be a hydraulic motor or an electric power source (e.g., an electric machine, such as an electric motor or motor-generator), in different examples. As such, the supplemental power source 142 may be configured as a power take-in (PTI) for selectively supplying power to the transmission 102 in addition or as an alternative to the motive power source 104, as desired during different operating conditions, which will be elaborated on herein. Similar to the first and second output interfaces 106, 108, suitable mechanical structures provided in the input interface 140 may include drive shafts, gears, belts, chains and the like to transfer power from the supplemental power source 142 to the transmission 102.

A third disconnect device 144 is coupled to the second input interface 140. The third disconnect device 144 is designed to selectively mechanically couple a shaft of the supplemental power source 142 to a shaft of the transmission 102 at the interface 140. The third disconnect device 144 may be similar to the first and second disconnect devices. As such, the third disconnect device may be designed to releasably mechanically couple the transmission 102 to the power source 142.

Figure 3:
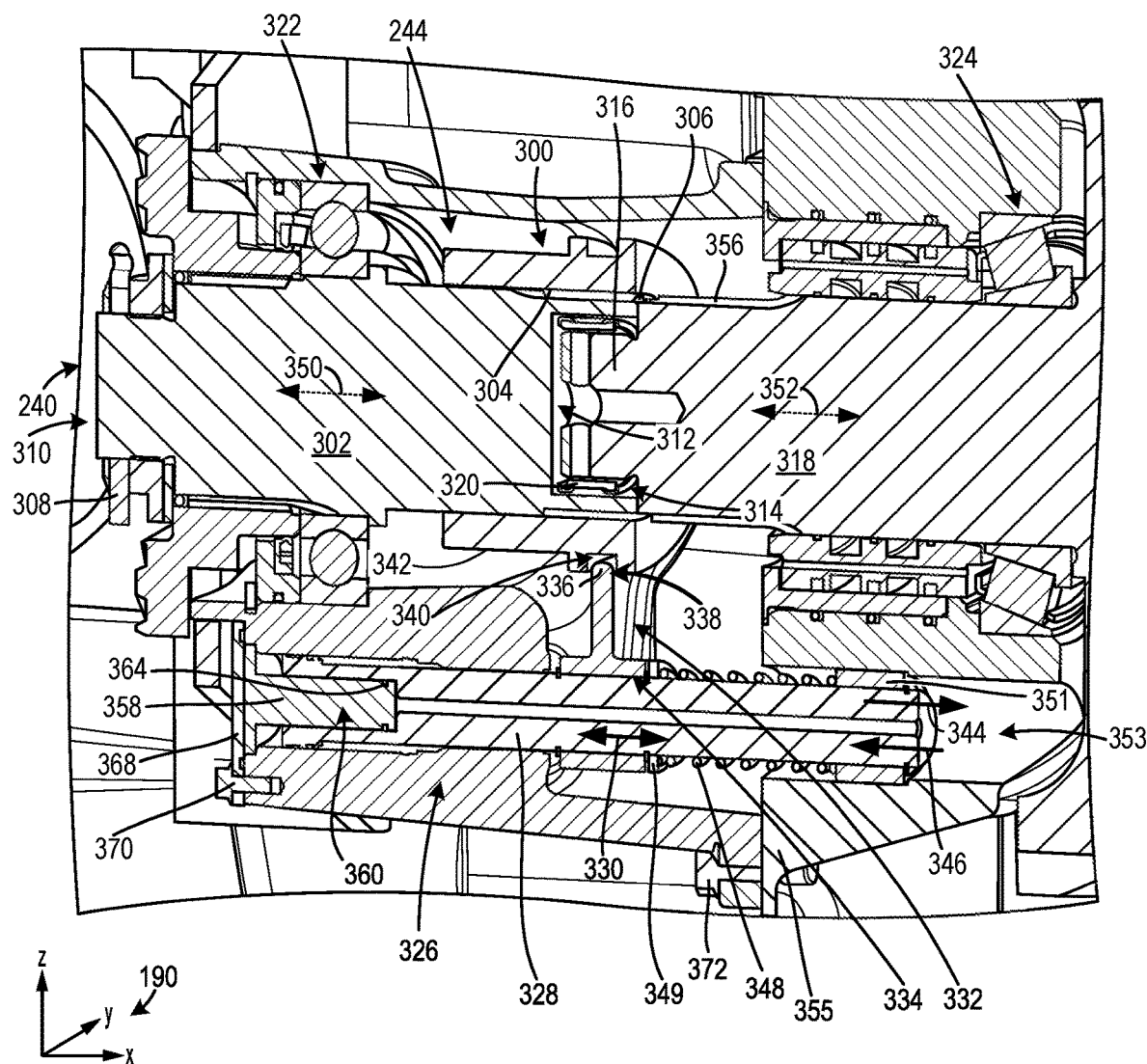
FIG. 3 shows a detailed cross-sectional view of a disconnect device of the transmission system, depicted in FIG. 2, in a disengaged configuration.
Figure 4:
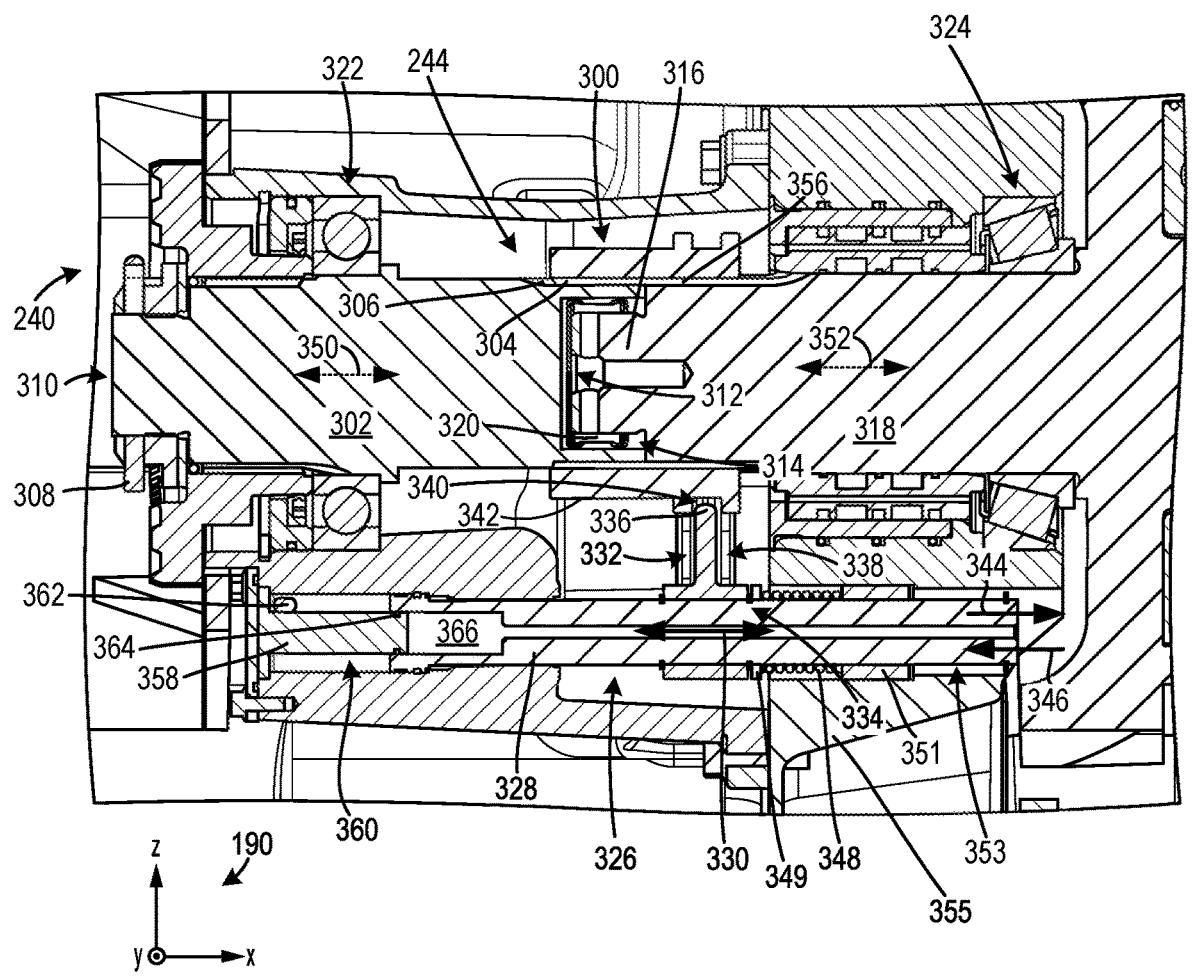
FIG. 4 shows a detailed cross-sectional view of the disconnect device in the transmission system, depicted in FIG. 2, in an engaged configuration.

The first, second, and third disconnect devices 126, 128, and 144 may have a similar design, in one example. FIGS. 3-4 depict a detailed illustration of an exemplary disconnect device, described in greater detail herein.

A hydraulic actuation system 130 for the disconnect devices 126, 128, 144 is further provided in the transmission. The hydraulic actuation system 130 may supply pressurized hydraulic fluid (e.g., oil) to actuators of the first, second, and third disconnect devices 126, 128, and 144. The hydraulic actuation system 130 may include a regulator pressure valve 132 included in the transmission 102. The regulator pressure valve 132 may receive pressurized fluid from a pump 133 that is driven by the motive power source 104. Further, the regulator pressure valve 132 may be in fluidic communication with selector valves (e.g., solenoid valves) 134, 136, and 146 of the first, second, and third disconnect devices 126, 128, and 144, respectively. Hydraulic lines 138 therefore extend between the regulator pressure valve 132 and the selector valves 134, 136, 146. The selector valves 134, 136, 146 may be arranged in at least an open and a closed state that permits and inhibits disconnect device engagement and disengagement. In turn, the selector valves may be hydraulically coupled to hydraulic actuators in the disconnect devices 126, 128, 144, described in greater detail herein with regard to FIGS. 2-4. The selector valve may specifically be controlled by a transmission control unit (TCU) described in greater detail herein to de-activate the disconnect system.

The vehicle 100 may further include a control system 150 with a transmission control unit (TCU) 152 as shown in FIG. 1. The control system may include other controllers such as a vehicle control unit (VCU), an engine control unit (ECU), and the like. The TCU 152 may include a microcomputer 154 with components such as a processor (e.g., microprocessor unit), input/output ports, an electronic storage medium for executable programs and calibration values (e.g., a read-only memory chip, random access memory, and/or keep alive memory), a data bus, and the like. The storage medium (e.g., memory) may be programmed with computer readable data representing instructions executable by the processor for performing the methods and control techniques described herein as well as other variants that are anticipated but not specifically listed.

The TCU 152 may receive various signals from sensors 156 coupled to various regions of transmission 102 or the vehicle 100, more generally, in some cases. For example, the sensors 156 may include a speed sensor coupled to the motive power source, a pedal position sensor designed to detect depression of an operator-actuated pedal, such as an accelerator pedal or a brake pedal, speed sensors at the vehicle wheels 118, 120, an ambient temperature sensor, a temperature sensor coupled to the transmission 102, etc. An input device 158 (e.g., accelerator pedal, brake pedal, combinations thereof, etc.) may further provide input signals indicative of an operator's intent for vehicle control.

Upon receiving the signals from the various sensors 156 of FIG. 1, the TCU 152 processes the received signals, and employs various actuators 160 of vehicle components to adjust the components based on the received signals and instructions stored on the memory of the TCU 152. For example, the TCU may send commands to the regulator pressure valve 132, and responsive to receiving the command an actuator in the valve may be adjusted to vary the pressure supplied to downstream components. In another example, the TCU may send control commands to one or a combination of the selector valves 134, 136, 144 to cause actuator adjustment which allows or inhibits hydraulic fluid flow to the corresponding disconnect device. The other controllable components in the transmission may function in a similar manner.

Figure 2:
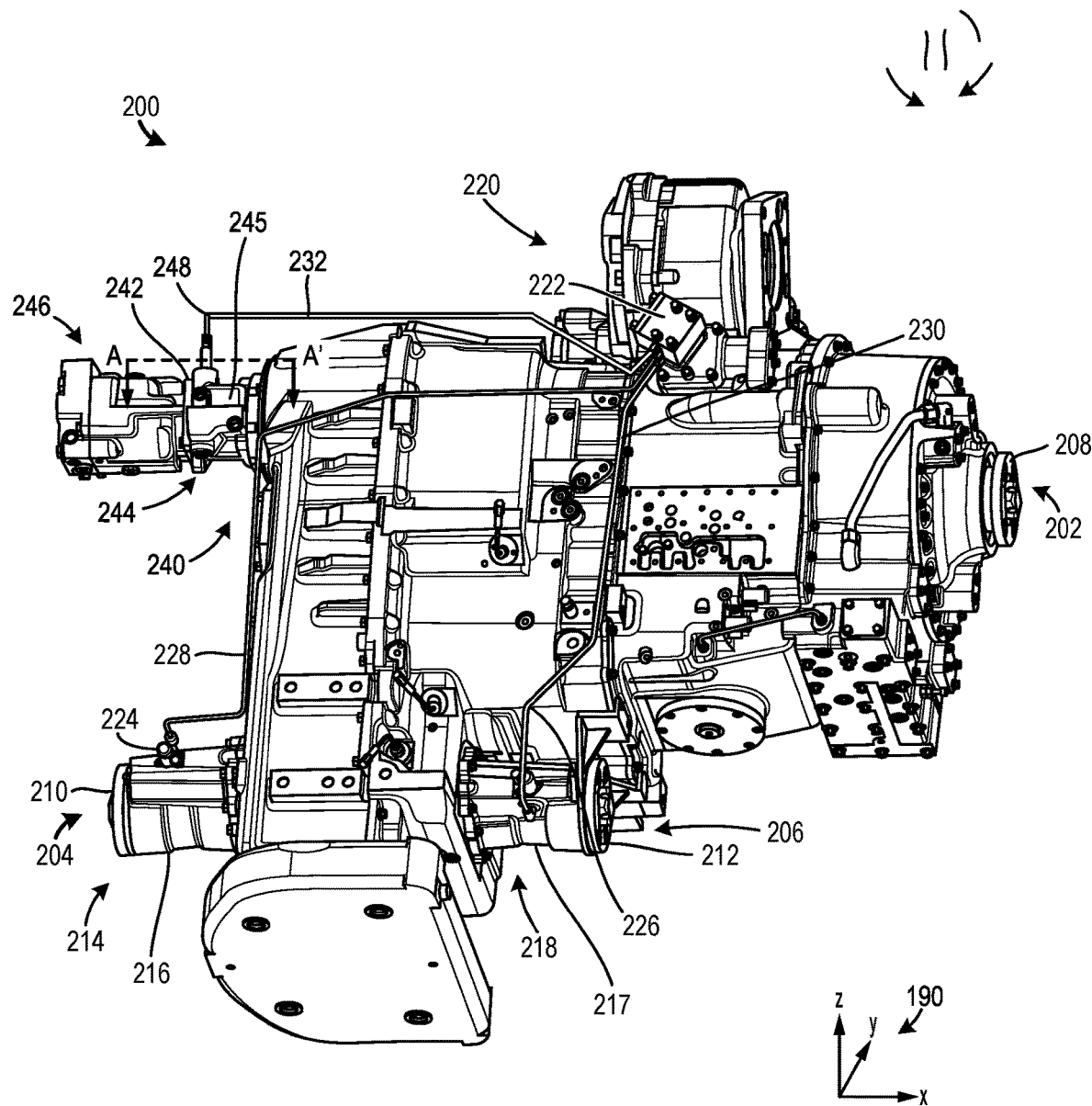
FIG. 2 shows a perspective view of a transmission system.

An axis system 190 is provided in FIG. 1, as well as FIG. 2-4, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 shows a detailed illustration of an exemplary transmission 200. The transmission 200 may be included in a vehicle such as the vehicle 100 shown in FIG. 1. Therefore, the transmission 200 may have at least some common structural and functional features with the transmission 102, shown in FIG. 1. For instance, the transmission 200 includes a first input interface 202, a first output interface 204, a second output interface 206, and a second input interface 240. Redundant description of the overlapping structural and functional characteristics of the components in the transmission systems, shown in FIGS. 1 and 2, is omitted for concision. The output interfaces 204, 206 may be coaxially arranged, in some examples. The coaxial output interface arrangement may permit the transmission to be efficiently connected to the drive axles, although other output interface positions may be used, in other embodiments. The second input interface 240 may be axially offset from the first input interface 202, in some examples. Further, the first input interface 202 may be axially offset from the output interfaces 204, 206, providing a targeted amount of transmission drop. However, in other arrangements, at least one of the output interfaces 204, 206 and/or the second input interface 240 may be coaxially arranged with the first input interface 202.

The input interfaces 202, 240 and the output interfaces 204, 206 are illustrated with flanges 208, 242, 210, 212, respectively, to facilitate efficient attachment to upstream and downstream components via mechanical attachment devices (e.g., bolts, screws, and the like). Specifically, the flange 208 at the first input interface 202 may facilitate coupling of a primary motive power source with the transmission 200. The primary motive power source may be an internal combustion engine (ICE) (e.g., spark and/or compression ignition engine) or an electric machine (e.g., electric motor or motor-generator), in different examples. Further, the flange 242 at the second input interface 240 may facilitate coupling of a supplemental power source 246 with the transmission 200, which may optionally (e.g., selectively) provide power to the transmission in addition or as an alternative to the primary motive power source during different operating conditions, which will be elaborated on herein. In some examples, the supplemental power source 246 may be a hydraulic motor or an electric motor. Still further, the output interface flanges 210, 212 may be connected to mechanical components that are attached to vehicle drive axles.

The transmission 200 includes a first disconnect device 214 designed to selectively rotationally couple and decouple the output interface 204 from a transmission shaft. The transmission further includes a second disconnect device 218 designed to rotationally couple and decouple the output interface 206 from another transmission shaft. As described herein, engagement of a disconnect device at either of the output interfaces 204, 206 denotes the mechanical attachment between the transmission and the components providing power to the drive axle. Conversely, disengagement of the output interface disconnect device(s) denotes the mechanical decoupling of the transmission and the components providing power to the drive axle(s). In other words, during disengagement of the disconnect device, the corresponding drive axle may rotate freely with regard to the transmission. In this way, multiple drive axles may be rotationally coupled and decoupled from the transmission during different operating conditions.

It will be appreciated that the transmission shafts to which the output interface disconnect devices 214, 218 are attached may be rotationally coupled to upstream transmission components and more generally the transmission's input. Specifically, as illustrated, the first disconnect device 214 is enclosed in a housing section 216, and the second disconnect device 218 is enclosed in another housing section 217.

The transmission 200 further includes a third disconnect device 244 designed to selectively rotationally couple and decouple the supplemental power source 246 from the transmission. Engagement of the disconnect device 244, as described herein, denotes the mechanical attachment between a shaft of the supplemental power source 246 and a shaft of the transmission, such that the supplemental power source supplies rotational power to the transmission at the input interface 240. Conversely, disengagement of the disconnect device 244 denotes the mechanical decoupling of the supplemental power source and the transmission. In this way, the transmission 200 may selectively receive power from the supplemental power source 246 as desired during different operating conditions. As illustrated, the third disconnect device 244 is enclosed in a housing section 245. Cross-sectional views of the third disconnect device 244 are illustrated in FIGS. 3-4 and described in greater detail herein, where cutting plane A-A' indicates the location of the cross-sectional views illustrated in FIGS. 3-4.

Continuing with FIG. 2, a hydraulic actuation system 220 may be provided in the transmission to trigger engagement and disengagement of the disconnect devices 214, 218, 244. More specifically, the hydraulic actuation system 220 may include a regulator valve 222 that supplies hydraulic fluid (e.g., oil) to selector valves 224, 226, 248 via hydraulic lines 228, 230, 232 to selectively supply the hydraulic fluid to the disconnect devices 214, 218, 244. In some examples, the selector valves are coupled to an exterior of the transmission's housing adjacent to the associated disconnect devices, as illustrated by the selector valve 224 at the housing section 216 corresponding to the first disconnect device 214. However, in other examples, one or more of the selector valves may be hydraulically coupled to the corresponding disconnect device, but mounted in a different location in the hydraulic line, such as in a location closer to the regulator valve and spaced away from the corresponding disconnect device, as particularly illustrated by the selector valves 226, 248 associated with the disconnect devices 218, 244, respectively. The regulator valve 222 may further be designed to control operation of other hydraulic components in the transmission, such as wet friction clutches. To elaborate, the regulator valve 222 may control the pressure of the hydraulic fluid provided to clutches in the transmission for shifting operation, for instance. The regulator valve 222 may be in fluidic communication with a pump that is driven by the primary motive power source.

FIGS. 3 and 4 show detailed views of the third disconnect device 244 in a disengaged and an engaged configuration, respectively. In the disengaged configuration, depicted in FIG. 3, power transfer between the supplemental power source (e.g., the supplemental power source 246 shown in FIG. 2) and the transmission by way of the input interface 240 is inhibited. On the other hand, in an engaged configuration, depicted in FIG. 4, power transfer between the supplemental power source and the transmission 200 by way of the input interface 240 is permitted.

The disconnect device 244 may include a splined sleeve 300. The splined sleeve 300 is coupled to an input shaft 302 of the input interface 240 via spline engagement between the sleeve and the shaft. To elaborate, the splined sleeve 300 may include interior splines 304 that mate with exterior splines 306 in the input shaft 302. These splines axially traverse the sleeve and the shaft. As described herein, splines include ridges and grooves.

A flange 308 may reside at one end 310 of the input shaft 302 to enable the transmission to mechanically couple to the supplemental power source. The other end 312 of the input shaft 302 may include a recess 314 designed to mate with an extension 316 of a transmission shaft 318. A bearing 320 (e.g., a roller bearing such as a needle roller bearing) may be positioned between the extension of the transmission shaft 318 and the input shaft 302 to allow for rotation therebetween when the disconnect device is disengaged. As described herein, a bearing may generally include an inner race, an outer race, and roller elements (e.g., cylinders, balls, tapered cylinders, etc.) positioned between the races.

A bearing (e.g., ball bearing) 322 may be coupled to the input shaft 302. Further, a bearing 324 (e.g., tapered roller bearing) may be attached to the transmission shaft 318. The sleeve 300 may be axially positioned between the bearing 322 and the bearing 324, to increase transmission compactness. However, other bearing and sleeve arrangements that may be less compact can be used, in other embodiments.

The disconnect device 244 may further include a hydraulically operated actuator 326. The hydraulic actuator 326 includes a piston (e.g., a rod) 328 that is designed to axially translate in opposing axial directions 330. A fork 332 may be coupled to the actuator piston 328. The fork 332 specifically may circumferentially surround and be fixedly coupled to the piston 328 at a first end 334. A protrusion 336 may reside on a second end 338 of the fork 332. The protrusion 336 mates with a recess 340 in an exterior surface 342 of the sleeve 300. This connection between the fork 332 and the sleeve 300 allows the actuator's axial movement to be translated into axial sleeve movement. Thus, when the actuator's piston 328 move axially in direction 344, the sleeve 300 may correspondingly move in a similar axial direction. In one example, the direction 344 may be an engagement direction. Conversely, the piston's movement in the opposite direction 346, again causing the sleeve to correspondingly move in a similar axial direction, may be a disengagement direction.

The hydraulic actuator 326 may further include a spring 348. The spring 348 is designed to exert a return force on the piston 328 when the disconnect device 244 is engaged. The spring 348 may be axially delimited at one end by a ring 349 fixedly coupled to the piston 328. Further, the ring 349 may be positioned axially interior to the fork 332 to permit the spring 348 to be compactly incorporated into the hydraulic actuator. However, other positions of the ring and the spring may be used, in other examples. Additionally, a bushing 351 may reside in a recess 353 of a housing 355 of the actuator 326. During actuation of the piston 328, the position of the bushing 351 may remain substantially fixed, which permits compression and decompression of the spring 348, during disconnect device engagement and disengagement.

The hydraulic actuator 326 may include a pin 358 fixedly coupled to the housing 355 of the actuator. A hydraulic chamber 360 may be provided in the actuator that is in fluidic communication with the selector valve 248, shown within the hydraulic line 232 in FIG. 2, via an opening 362, shown in FIG. 4. Increasing the pressure of the fluid in the chamber 360 increases the axial force applied to the piston 328 in the axial direction 344 (e.g., the engagement direction). A seal 364 may be coupled to the pin 358 to seal the hydraulic chamber 360. The pin 358 resides in a cavity 366 in the piston 328, as illustrated in FIG. 4. The mated engagement between the pin 358 and the cavity 366 guides axial movement of the piston 328 during engagement and disengagement of the disconnect device 244. Additionally, the rotational axes 350, 352 of the input shaft 302 and the transmission shaft 318, respectively, are provided for reference and may be coaxial.

FIG. 3 specifically depicts the disconnect device 244 in the disengaged configuration (e.g., where the transfer of power from the supplemental power source to the transmission by way of input interface 240 is inhibited). To transition the disconnect device 244 into the disengaged configuration, the pressure in the hydraulic chamber 360 may be decreased below a threshold value. Responsive to the drop in hydraulic chamber pressure, the spring 348 pushes the piston 328 in direction 346, which causes the fork 332 to move the sleeve 300 such that it decouples from splines 356 in the transmission shaft 318. The threshold pressure therefore may correspond to a spring constant of the spring 348. The characteristics of the spring may therefore be chosen to achieve a desired threshold engagement pressure. Further, during disconnect device disengagement, the cavity 366 of the piston 328, shown in FIG. 4, further encloses the pin 358 while the spring 348 decompresses, due to the piston moving axially away from the bushing 351. Thus, as shown in FIG. 3, the splines 304 in the splined sleeve 300 are decoupled from the splines 356 in the transmission shaft 318. In the disengaged configuration, the spring is decompressed and the hydraulic pressure applied to the hydraulic actuator 326 is below the threshold value. In this way, the disconnect device may passively remain disconnected.

The disconnect device 244, as well as the other disconnect devices described herein, may be automatically placed in the disengaged configuration when the pressure of the hydraulic fluid supplied to the hydraulic actuator 326 is decreased, due to the hydraulic pump driven by the primary motive power source (e.g., engine or motor) being shut-down, for instance. In this way, the transmission may be disconnected from the supplemental power source during certain operations, such as vehicle towing, for example, thereby decreasing transmission wear and circumventing potential transmission component degradation that stems from a lack of component lubrication, during engine shut-down. Conversely, during some operating conditions, such as when low vehicle speed or additional power for acceleration is demanded, the disconnect device 244 may be engaged to provide supplemental power to the transmission in addition to or as an alternative to the motive power source. Hydraulically operating the disconnect devices using fluid pressurized by the engine or motor allows the system to dispense with an electric motor for actuating the disconnect devices, if wanted. Consequently, the cost and complexity of the system may be reduced.

Further in certain examples, to actively induce disengagement of the disconnect device 244 (or the other disconnect devices 214, 218 depicted in FIG. 2), the TCU may adjust the selector valve 248, shown in FIG. 2, to decrease the pressure of the hydraulic fluid delivered to the hydraulic actuator 326. The active disengagement of the disconnect device may be carried out when supplemental power is not demanded, when the primary motive power source provides adequate power to the transmission. In this way, transmission efficiency is increased while decreasing transmission wear.

Further, as shown in FIG. 3, the hydraulic actuator 326 may be axially offset from the input shaft 302 and the transmission shaft 318, to increase transmission compactness. Additionally, a plate 368 may be coupled to the housing 355 via attachment devices 370 to secure the pin 358 therein. Further, the pin 358 and the plate 368 may be positioned radially outward from the flange 308 to enable the hydraulic actuator to be efficiently installed and accessed during transmission servicing and repair, for instance. However, other housing configurations have been contemplated, in other embodiments. Further, the housing 355 may be formed in sections that are secured via attachment devices 372, although a monolithic housing structure may be used, in other embodiments.

The bearings 324 may be coupled to a section of the housing 355 adjacent to the recess 353, and the bearing 322 may be attached to a section of the housing 355 adjacent to the piston 328. In this way, the input shaft 302 and the transmission shaft 318 may be able to independently rotate with respect to the hydraulic actuator 326.

FIG. 4 specifically depicts the disconnect device 244 in the engaged configuration. To transition the disconnect device 244 into the engaged configuration, the pressure in the hydraulic chamber 360 may be increased via operation of the selector valve 248 in conjunction with the regulator valve 222. When the pressure in the hydraulic chamber 360 surpasses the actuation threshold, the piston 328 moves in axial direction 344. Responsive to the piston movement, the sleeve 300 also moves axially away from the input interface 240. As the sleeve 300 moves in the engagement direction, the sleeve's interior splines 304 mate with the splines 356 in the transmission shaft 318. As such, when the disconnect device 244 is engaged, the sleeve 300 mates with splines in both the input shaft 302 and the transmission shaft 318, thereby mechanically coupling supplemental power source to the transmission. The first and second disconnect devices 214, 218, shown in FIG. 2, may function in a similar manner to the first disconnect device 244, described with regard to FIGS. 3-4, and therefore may include similar components for selectively coupling and decoupling first and second drive axles from the transmission. Further, in some embodiments, the TCU may be designed to actively control both disconnect devices independently to allow one of the first and second disconnect devices to be decoupled from the corresponding drive axle while the other remains engaged.

Figure 5:
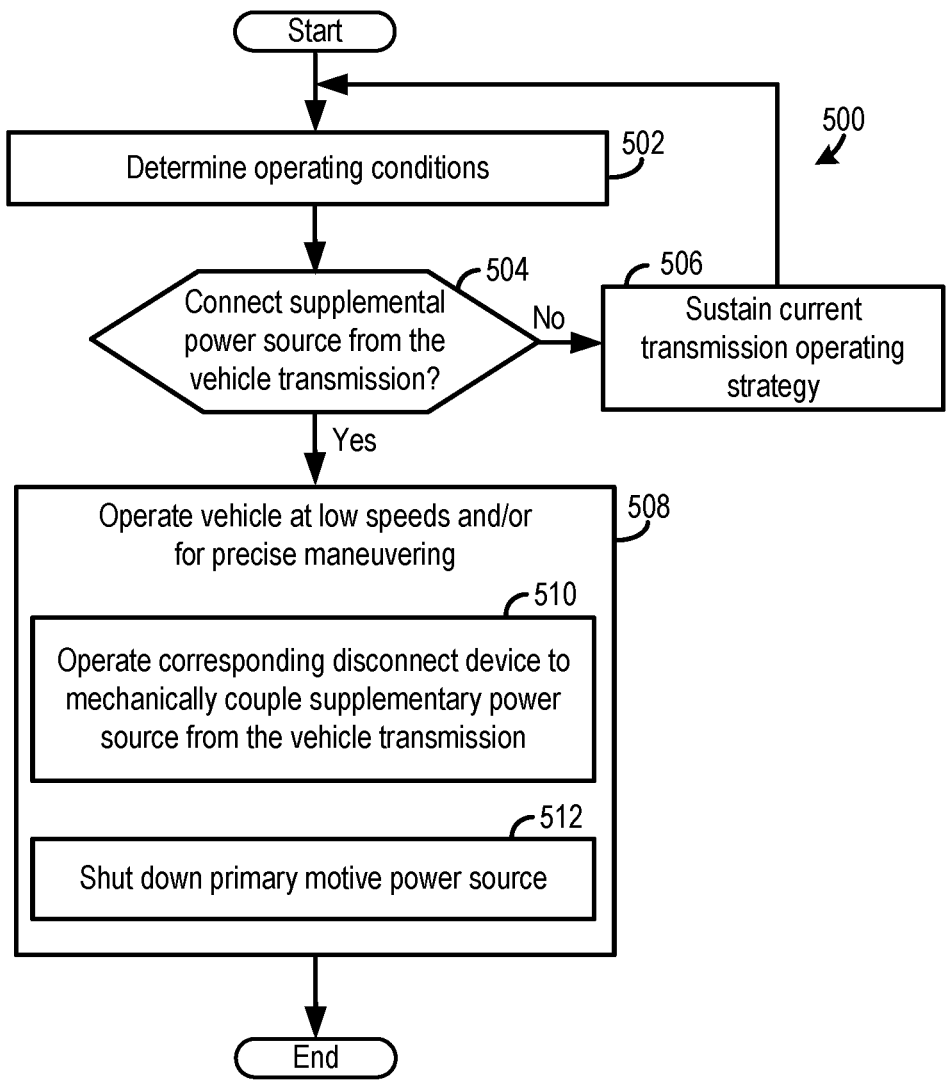
FIG. 5 shows a method for operation of a transmission system.

FIG. 5 shows a method 500 for operation of a transmission system. The method 500 may be carried out by the transmissions and corresponding components described above with regard to FIGS. 1-4. As such, the transmission system may include a motive power source, a supplemental power source, and at least one disconnect device for selectively coupling and decoupling the supplemental power source from the transmission. However, in other examples, the method 500 may be implemented using other suitable transmissions and components. Specifically, the method may be carried out as instructions stored in memory executed by a processor in TCU. As such, performing the method steps may include sending and/or receiving commands which trigger adjustment of associate components, as previously indicated.

At 502, the method includes determining operating conditions. The operating conditions may include transmission input speed, transmission output speed, engine speed, motor speed, ambient temperature, vehicle speed, vehicle load, and the like. These operating conditions may be determined via sensor inputs and/or modelling.

At 504, the method judges whether or not to mechanically rotationally couple the supplemental power source from the transmission. This judgement may be carried out based on operator input requesting a desired operating state during particular driving applications. For instance, the operator input may indicate that precise maneuvering of the vehicle and/or low vehicle speeds are demanded, in one particular example, and the disconnect device associated with the supplemental power source may be operated according to the judgement. In other examples, however, the operator input evaluated in the judgement may correspond to a request for additional power and/or acceleration.

If it is judged that coupling the supplemental power source to the transmission is not desired (NO at 504), the method moves to 506 where the method includes maintaining the current transmission operating strategy. For instance, the disconnect device between a transmission input and the supplemental power source may remain in a disengaged configuration where the supplemental power source does not supply rotational energy to the transmission.

Conversely, if it is judged that coupling the supplemental power source to the transmission is desired (YES at 504), the method moves to 508 where the vehicle is operated at a low speed for precise maneuvering. The operation at 508 further includes, at 510, operating the corresponding disconnect device to mechanically couple the supplemental power source to the transmission at an input interface thereof (e.g., by positioning the disconnect device in an engaged configuration). For instance, the regulator and selector valves may be operated to increase the pressure provided to the disconnect device's hydraulic actuator, thereby positioning the disconnect device in an engaged configuration. Even further, the method may include, at 512, shutting down a primary motive power source, such as an internal combustion engine. In some examples, however, the motive power source may remain operating in a neutral state so as to drive a transmission pump and provide regular pressure and lubrication flow in other components of the transmission. In this way, transmission efficiency may be increased as the supplemental power source is used for certain vehicle operations, rather than relying solely on the primary motive power source. Further, by providing an efficient way of connecting and disconnecting the supplemental power source to the transmission as desired, a smaller and more efficient engine may be utilized in the drivetrain, transmission efficiency may be further increased.

The technical effect of the transmission operating method described herein is to decrease power consumption and increase transmission efficiency by selectively connecting and disconnecting the supplemental power source from the transmission when additional or alternative power is demanded in the transmission system, such as when precise maneuvering is demanded at low vehicle speeds.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle transmission is provided that includes an input interface configured to mechanically couple to a motive power source, a supplemental input interface configured to mechanically couple to a supplemental power source, and a first disconnect device releasably mechanically coupling the supplemental power source to the vehicle transmission, wherein the disconnect device is hydraulically actuated.

In another aspect, a vehicle transmission is provided that comprises a supplemental power source having an input shaft; and a first disconnect device coupled to the input shaft and including: a splined sleeve mated with the input shaft; and a hydraulic actuation system including a hydraulic actuator coupled to the splined sleeve, wherein the hydraulic actuator is configured to axially translate the splined sleeve in opposing directions to place the hydraulic actuator in an engaged configuration and a disengaged configuration; wherein, in the engaged configuration, the splined sleeve mates with a splined transmission shaft; and wherein the hydraulic actuation system is configured to automatically transition the hydraulic actuator into the disengaged configuration responsive to a hydraulic pressure in the hydraulic actuation system decreasing below a threshold value.

In yet another aspect, a method for operation of a vehicle transmission is provided that comprises automatically operating a first disconnect device to mechanically decouple a supplemental power source from the vehicle transmission when a pressure in a hydraulic actuation system coupled to the first disconnect device decreases below a threshold value; and automatically operating a second disconnect device to mechanically decouple a drive axle from the vehicle transmission when a pressure in a hydraulic actuation system coupled to the second disconnect device decreases below a threshold value; wherein the disconnect devices include a splined sleeve mated with a shaft; wherein the hydraulic actuation system comprises a hydraulic actuator coupled to the splined sleeve. The method may further comprise shutting down a motive power source to decrease the pressure in the hydraulic actuation system, in one example.

In any of the aspects or combinations of the aspects, the first disconnect device may be configured to receive pressurized fluid from a regulator valve of the vehicle transmission.

In any of the aspects or combinations of the aspects, the first disconnect device may include a first sleeve that has a plurality of interior splines configured to selectively mechanically engage counterpart exterior splines in a shaft of the supplemental power source and a transmission shaft.

In any of the aspects or combinations of the aspects, the supplemental power source may be coupled to a housing of the transmission, and the supplemental power source may be electrically powered or hydraulically powered, wherein the supplemental power source drives the vehicle while an internal combustion engine is shut down.

In any of the aspects or combinations of the aspects, in the engaged configuration of the hydraulic actuator, a hydraulic pressure may maintain a hydraulic cylinder in an engaged position and a spring may exert a return force on the hydraulic cylinder.

In any of the aspects or combinations of the aspects, the hydraulic actuation system may be in fluidic communication with a hydraulic assembly driven by an internal combustion engine or a traction motor; and, responsive to a hydraulic pressure in the hydraulic assembly decreasing below a disconnect threshold value, a selector valve in the hydraulic actuation system may change to a disengagement state that initiates the transition of the hydraulic actuator from the engaged configuration to the disengaged configuration.

In any of the aspects or combinations of the aspects, the vehicle transmission may further comprise a transmission control unit (TCU) including instructions that when executed cause the TCU to adjust the state of the selector valve based on one or more operating conditions in the vehicle transmission.

In any of the aspects or combinations of the aspects, the selector valve may be a solenoid valve.

In any of the aspects or combinations of the aspects, the hydraulic pressure in the hydraulic actuation system may be supplied by a regulator pressure valve included in the vehicle transmission.

In any of the aspects or combinations of the aspects, the vehicle transmission may further comprise a second disconnect device including: a splined sleeve mated with an output shaft configured to rotationally couple to a drive axle; and a hydraulic actuation system including a hydraulic actuator coupled to the splined sleeve and configured to axially translate the splined sleeve in opposing directions to place the hydraulic actuator in an engaged configuration and a disengaged configuration, wherein in the engaged configuration the splined sleeve mates with a splined transmission shaft.

In any of the aspects or combinations of the aspects, the vehicle transmission may further comprise a transmission control unit (TCU) including instructions that when executed cause the TCU to disengage one of the first and second disconnect devices based on one or more operating conditions in the vehicle transmission.

In any of the aspects or combinations of the aspects, the vehicle transmission may further comprise an input interface configured to rotationally couple to an internal combustion engine.

In any of the aspects or combinations of the aspects, the vehicle transmission may further comprise an input interface configured to rotationally couple to a traction motor.

In any of the aspects or combinations of the aspects, the splined sleeve may include a plurality of splines on an interior surface and the splined transmission shaft may include a plurality of splines on an exterior surface.

In any of the aspects or combinations of the aspects, the disconnect devices may include a spring loaded piston that is compressed in an engaged position.

In any of the aspects or combinations of the aspects, the supplemental power source may be an internal combustion engine or an electric motor.

In any of the aspects or combinations of the aspects, the hydraulic pressure in the hydraulic actuation system may be supplied by a regulator pressure valve included in the vehicle transmission.

In another representation, a vehicle transmission assembly is provided that comprising a first disconnect mechanism that is designed to disconnect the transmission assembly from an auxiliary power source when a pressure supplied to the disconnect mechanisms via a pump coupled to an engine or an electric motor decreases below a threshold value, wherein the supplemental power source is a hydraulic or electric motor.

Note that the example control and estimation routines included herein can be used with various powertrain, electric drive, engine, and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the terms "substantially" and "approximately" are construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle transmission, comprising:
 a motive power source input interface configured to mechanically couple to a motive power source;
 a motor input interface configured to mechanically couple to an electric or hydraulic motor;

a disconnect device releasably mechanically coupling the electric or hydraulic motor to the vehicle transmission, wherein the disconnect device is hydraulically actuated; and a hydraulic actuation system including a hydraulic actuator coupled to a splined sleeve;

wherein the hydraulic actuator includes a piston with a hydraulic cavity therein that is profiled to mate with a pin to guide axial movement of the piston;

wherein, in an engaged configuration of the hydraulic actuator, a hydraulic pressure maintains a hydraulic cylinder in an engaged position and a spring exerts a return force on the hydraulic cylinder;

wherein the hydraulic actuation system is in fluidic communication with a hydraulic assembly driven by an internal combustion engine or a traction motor; and wherein responsive to a hydraulic pressure in the hydraulic assembly decreasing below a disconnect threshold value, a selector valve in the hydraulic actuation system changes to a disengagement state that initiates the transition of the hydraulic actuator from the engaged configuration to the disengaged configuration.

2. The vehicle transmission of claim 1, wherein the disconnect device is configured to receive pressurized fluid from a regulator valve of the vehicle transmission.

3. The vehicle transmission of claim 2, wherein the disconnect device includes a first sleeve that has a plurality of interior splines configured to selectively mechanically engage counterpart exterior splines in an input shaft and a transmission shaft, wherein the input shaft is included in the motor input interface that is configured to mechanically couple to the electric or hydraulic motor.

4. The vehicle transmission of claim 1, further comprising the electric or hydraulic motor coupled to a housing of the vehicle transmission, wherein the electric or hydraulic motor drives the vehicle while internal combustion engine or traction motor is shut down.

5. A vehicle transmission, comprising:
a supplemental power source having an input shaft; and
a first disconnect device coupled to the input shaft, including:
a splined sleeve mated with the input shaft; and
a hydraulic actuation system including a hydraulic actuator coupled to the splined sleeve, wherein the hydraulic actuator is configured to axially translate the splined sleeve in opposing directions to place the hydraulic actuator in an engaged configuration and a disengaged configuration;
wherein, in the engaged configuration, the splined sleeve mates with a splined transmission shaft;
wherein the hydraulic actuation system is configured to automatically transition the hydraulic actuator into the disengaged configuration responsive to a hydraulic pressure in the hydraulic actuation system decreasing below a threshold value;
wherein, in the engaged configuration of the hydraulic actuator, a hydraulic pressure maintains a hydraulic cylinder in an engaged position and a spring exerts a return force on the hydraulic cylinder; and
wherein:
the hydraulic actuation system is in fluidic communication with a hydraulic assembly driven by an internal combustion engine or a traction motor; and
responsive to a hydraulic pressure in the hydraulic assembly decreasing below a disconnect threshold value, a selector valve in the hydraulic actuation system changes to a disengagement state that initiates the transition of the hydraulic actuator from the engaged configuration to the disengaged configuration.

6. The vehicle transmission of claim 5, further comprising a transmission control unit (TCU) including instructions that when executed cause the TCU to:
adjust the state of the selector valve based on one or more operating conditions in the vehicle transmission.

7. The vehicle transmission of claim 5, wherein the selector valve is a solenoid valve.

8. The vehicle transmission of claim 5, wherein the hydraulic pressure in the hydraulic actuation system is supplied by a regulator pressure valve included in the vehicle transmission.

9. The vehicle transmission of claim 5, further comprising:
a second disconnect device including:
a splined sleeve mated with an output shaft configured to rotationally couple to a drive axle; and
a hydraulic actuation system including a hydraulic actuator coupled to the splined sleeve and configured to axially translate the splined sleeve in opposing directions to place the hydraulic actuator in an engaged configuration and a disengaged configuration, wherein in the engaged configuration the splined sleeve mates with a splined transmission shaft.

10. The vehicle transmission of claim 9, further comprising a transmission control unit (TCU) including instructions that when executed cause the TCU to:
disengage one of the first and second disconnect devices based on one or more operating conditions in the vehicle transmission.

11. The vehicle transmission of claim 5, further comprising an input interface configured to rotationally couple to the internal combustion engine.

12. The vehicle transmission of claim 5, further comprising an input interface configured to rotationally couple to the traction motor.

13. The vehicle transmission of claim 5, wherein the splined sleeve includes a plurality of splines on an interior surface and the splined transmission shaft includes a plurality of splines on an exterior surface.

14. A method for operation of a vehicle transmission, comprising:
automatically operating a first disconnect device to mechanically decouple a supplemental power source from the vehicle transmission when a pressure in a hydraulic actuation system coupled to the first disconnect device decreases below a threshold value, wherein the pressure in the hydraulic actuation system decrease below the threshold value in response to shutdown of an internal combustion engine that drives a hydraulic pump in the hydraulic actuation system;
automatically operating a second disconnect device to mechanically decouple a drive axle from the vehicle transmission when a pressure in the hydraulic actuation system coupled to the second disconnect device decreases below a threshold value;
wherein the first and second disconnect devices each include a splined sleeve mated with a shaft;
wherein the hydraulic actuation system comprises a hydraulic actuator coupled to each of the splined sleeves; and
wherein each of the hydraulic actuators is configured to axially translate the splined sleeve in opposing directions to place the hydraulic actuators in an engaged configuration and a disengaged configuration.

15. The method of claim 14, wherein the first and second disconnect devices include a spring loaded piston that is compressed in an engaged position.

16. The method of claim 15, further comprising shutting down the internal combustion engine to decrease the pressure in the hydraulic actuation system.

17. The method of claim 14, wherein the hydraulic actuator includes a piston with a hydraulic cavity therein that is profiled to mate with a pin to guide axial movement of the piston.

18. The method of claim 14, the hydraulic pressure in the hydraulic actuation system is supplied by a regulator pressure valve included in the vehicle transmission.

* * * * *